US010696211B2

(12) United States Patent
Fleszewski et al.

(10) Patent No.: US 10,696,211 B2
(45) Date of Patent: Jun. 30, 2020

(54) LIGHTING DEVICES AND SYSTEMS WITH ORIENTATION DETECTION AND CONTROL

(71) Applicant: Federal Signal Corporation, Oak Brook, IL (US)

(72) Inventors: Vincent S. Fleszewski, Crown Point, IN (US); Robert A. Czajkowski, Tinley Park, IL (US)

(73) Assignee: FEDERAL SIGNAL CORPORATION, Oak Brook, IL (US)

( * ) Notice: Subject to any disclaimer, the term of this patent is extended or adjusted under 35 U.S.C. 154(b) by 0 days.

(21) Appl. No.: 16/394,218

(22) Filed: Apr. 25, 2019

(65) Prior Publication Data
US 2019/0329702 A1 Oct. 31, 2019

Related U.S. Application Data

(60) Provisional application No. 62/663,550, filed on Apr. 27, 2018.

(51) Int. Cl.
| | | |
|---|---|---|
| *B60Q 1/26* | (2006.01) | |
| *F21V 23/04* | (2006.01) | |
| *F21S 43/20* | (2018.01) | |
| *B60Q 1/30* | (2006.01) | |
| *B60Q 1/28* | (2006.01) | |
| *F21Y 103/00* | (2016.01) | |
| *F21Y 113/10* | (2016.01) | |

(52) U.S. Cl.
CPC ......... *B60Q 1/2642* (2013.01); *B60Q 1/2607* (2013.01); *B60Q 1/28* (2013.01); *B60Q 1/307* (2013.01); *F21S 43/26* (2018.01); *F21V 23/0492* (2013.01); *F21Y 2103/00* (2013.01); *F21Y 2113/10* (2016.08)

(58) Field of Classification Search
CPC .......................... F21V 23/0492; B60Q 1/2642
See application file for complete search history.

(56) References Cited

U.S. PATENT DOCUMENTS

| | | | | |
|---|---|---|---|---|
| 6,030,099 A | * | 2/2000 | McDermott | ............. B60Q 1/08 362/276 |
| 10,154,560 B2 | * | 12/2018 | Nolan | ................... B60Q 1/115 |
| 2017/0307149 A1 | * | 10/2017 | Clark | ..................... F21V 29/76 |

OTHER PUBLICATIONS

Model 100 Halogen Beacon, https://www.fedsig.com/product/model-100-halogen-beacon, 4 pages, copyright 2019.
Model 14 Warning Beacon, https://www.fedsig.com/resource-document/file/7247, 2 pages, copyright 2010.
Self-leveling beacon mount, https://www.buyersproducts.com/product/self-leveling-beacon-mounting-bracket-2665b210880, 2 pages, retrieved Apr. 24, 2019.

* cited by examiner

*Primary Examiner* — Robert J May
(74) *Attorney, Agent, or Firm* — Merchant & Gould P.C.

(57) ABSTRACT

Lighting systems, devices, and units that provide illumination according to a detected orientation relative to a reference plane or a reference vector. In some examples, a light bar for use on a vehicle includes first and second sets of light emitters that are selectively activated and inactive based on a detected orientation of the light bar relative to a reference plane or reference vector.

12 Claims, 6 Drawing Sheets

LIGHTING DEVICES AND SYSTEMS WITH ORIENTATION DETECTION AND CONTROL

BACKGROUND

Vehicles are commonly equipped with signal lights. Brake lights, for example, when illuminated, indicate that brakes have been applied in the vehicle. Turn signal lights, when flashing, indicate that a vehicle may be intending to make a left or a right turn. Reverse lights, when illuminated, indicate that a vehicle is in reverse gear. Specialty vehicles, such as commercial vehicles, emergency vehicles, construction, and maintenance vehicles commonly include additional signal lights such as warning lights. In some vehicles, multiple warning lights are positioned in a light bar that is affixed to a vehicle, and the warning lights of the light bar are configured to illuminate or flash in a coordinated manner.

SUMMARY

In general terms, the present disclosure is directed to lighting devices and lighting systems that use an orientation detector and a controller to control light emission based on a detected orientation of the lighting device relative to a reference plane or relative to a direction of a gravity force vector.

The lighting device is mounted to, or integral with, an object that can assume multiple orientations relative to the reference plane or gravity force vector. For example, the lighting device can be mounted to the tiltable bed of a dump truck or a tiltable cab of a truck. In another example, the lighting device can be mounted to a boom or platform of a cherry picker. In another example, the lighting device can be mounted to a garage door. In another example, the lighting device can be mounted to a portion of an aircraft (e.g., a wing, an engine, a propeller, or a fuselage). In another example, the lighting device can be mounted to a portion of a boat (e.g., a hull, a deck, or a mast).

According to some examples, the reference plane is the plane tangent to the surface upon which the object (e.g., the vehicle) is resting and, more particularly, the tangent plane that coincides with at least one point on a fixed surface upon which the object is positioned that is closest to the lighting device or a predefined portion of the lighting device. In some examples, the tangent plane coincides with a point on the ground that is closest to the object or closest to the lighting device mounted to the object. According to other examples, the reference plane can be any predefined plane, such as a plane parallel to or tangent to a predefined surface of the object. According to some examples, the reference plane is a plane that is normal to a gravity force vector.

According to certain aspects of the present disclosure, a lighting system includes at least one light emitter, an orientation detector, and a controller, the controller being adapted to control illumination of the at least one light emitter based on a detected orientation provided by the orientation detector.

According to further aspects of the present disclosure, a lighting system includes a plurality of light emitters, an orientation detector, and a controller, the controller being adapted to control illumination of the plurality of light emitters based on a detected orientation provided by the orientation detector.

In some examples of the foregoing system, the light emitters, orientation detector and controller are included in a lighting unit having a housing. In some examples, the lighting unit is attachable to, and detachable from, an object, such as an automobile, boat, aircraft, or other vehicle, or another structure. One or more fasteners (e.g., screws, bolts) or other fastening means (e.g., adhesive) can be used to selectively mount the housing of the lighting unit to the appropriate portion of the object.

In some examples of the foregoing systems, the orientation detector comprises an accelerometer and detects, using gravity, an orientation of the plurality of light emitters relative to the ground or another reference plane, such as a plane that is normal to a gravity force vector.

In some examples of the foregoing systems, the plurality of light emitters include one or more light emitting diodes (LEDs), incandescent lamps, halogen lamps, halide lamps, neon lamps, or fluorescent lamps.

In some examples of the foregoing systems, the light emitters can be configured to emit light beams of a plurality of different colors, wavelength bands, or sets of wavelength bands of visible light, where the differences in color, wavelength bands, or sets of wavelength bands are detectable by an average human eye. In some examples, the system comprises one or more lenses and/or filters, and the light emitters can be configured to emit light beams that pass through the lenses having a plurality of different colors, and/or to emit light beams that pass through one or more filters that filter the emitted light beams into a plurality of different colors or wavelength bands, where the differences in color or wavelength bands or sets of wavelength bands are detectable by an average human eye. In some examples of the foregoing systems the light emitters can be configured to emit light beams of a single color or single wavelength band or single set of wavelength bands, and/or to emit light beams that pass through lenses of the same color and/or filters that filter the emitted light beams into a single color, a single wavelength band, or a single set of wavelength bands.

In some examples of the foregoing systems, one or more prisms are provided to deflect the direction of light beam propagation from one or more of the light emitters.

In some examples of the foregoing systems, one or more reflectors or reflecting surfaces are provided to focus the direction or directions of light beam propagation from one or more of the light emitters.

In some examples of the foregoing systems, one or more lenses are provided to spread out or focus light beam propagation from one or more of the light emitters.

In some examples of the foregoing systems, the plurality of light emitters include a first light emitter positioned to be activated when a first orientation is detected by the orientation detector and inactive when a second orientation is detected by the orientation detector, and a second light emitter positioned to be activated when the second orientation is detected by the orientation detector and inactive when the first orientation is detected by the orientation detector.

As used herein, a light emitter is "activated" when a signal is provided to the light emitter (e.g., by a controller) to emit light in a continuous or discontinuous (e.g., flashing) manner. As used herein, a light emitter is "inactive" when no signal is provided to the light emitter to emit light and/or when a signal is provided to the light emitter to not emit light.

In some examples of the foregoing systems, the plurality of light emitters include a first set of a plurality of light emitters positioned to be active when a first orientation is detected by the orientation detector and inactive when a second orientation is detected by the orientation detector, and a second set of a plurality of light emitters positioned to be active when the second orientation is detected by the orientation detector and inactive when the first orientation is detected by the orientation detector. In some examples, the light emitted by the first set of light emitters differs in one or more indicia from the light emitted by the second set of light emitters such that an attribute of the object (e.g., its orientation) can be determined based on the indicia presented. Such indicia can include, for example, colors or wavelength bands, flash patterns, beam width, beam brightness, etc.

According to further aspects of the present disclosure, a lighting device includes at least one light emitter, an orientation detector, and a controller, the controller being adapted to control illumination of the at least one light emitter based on a detected orientation provided by the orientation detector.

According to further aspects of the present disclosure, a lighting device is provided, the lighting device comprising a light bar and including a plurality of light emitters, an orientation detector, and a controller, the controller being adapted to control illumination of the plurality of light emitters based on a detected orientation provided by the orientation detector.

According to further aspects of the present disclosure, a lighting unit is provided, the lighting unit being removably mountable to an object and comprising a housing that houses a plurality of light emitters, an orientation detector, and a controller, the controller being adapted to control illumination of the plurality of light emitters based on a detected orientation provided by the orientation detector.

According to further aspects of the present disclosure, an object is provided, such as a vehicle or a fixed structure, which includes a lighting unit, a lighting device, or a lighting system in accordance with the present disclosure.

DETAILED DESCRIPTION

Figure 1:
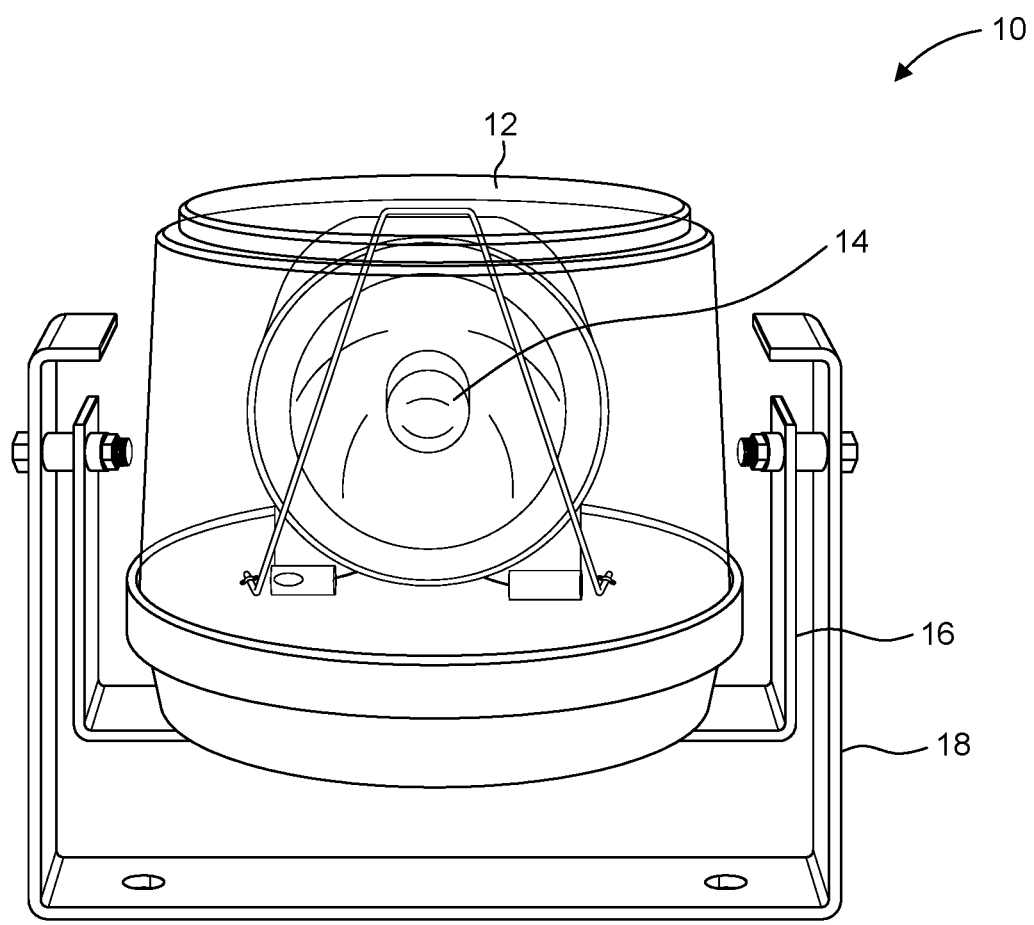
FIG. 1 depicts a prior art adjustable warning lighting unit.

The present disclosure is directed towards lighting systems, lighting devices and lighting units, such as warning or other signal lights used on vehicles and other objects. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 depicts a prior art adjustable warning light 10. The light 10 includes a partially transparent housing 12 housing a rotating bulb 14. The housing 12 is mounted to a first U-bracket 16. The first U-bracket 16 is pivotally fastened to a second U-bracket 18, which is configured to be mounted to a vehicle. Due to the pivotal cooperation of the first and second U-brackets 16 and 18, the direction of beam propagation from the bulb 14 can be maintained to some degree when the overall unit 10 is tilted relative to the force of gravity.

The warning light 10 suffers from several disadvantages including, e.g., a high weight, large amount of material needed for the mechanical components, and high maintenance costs for maintaining the mechanical components in operable condition.

Figure 2:
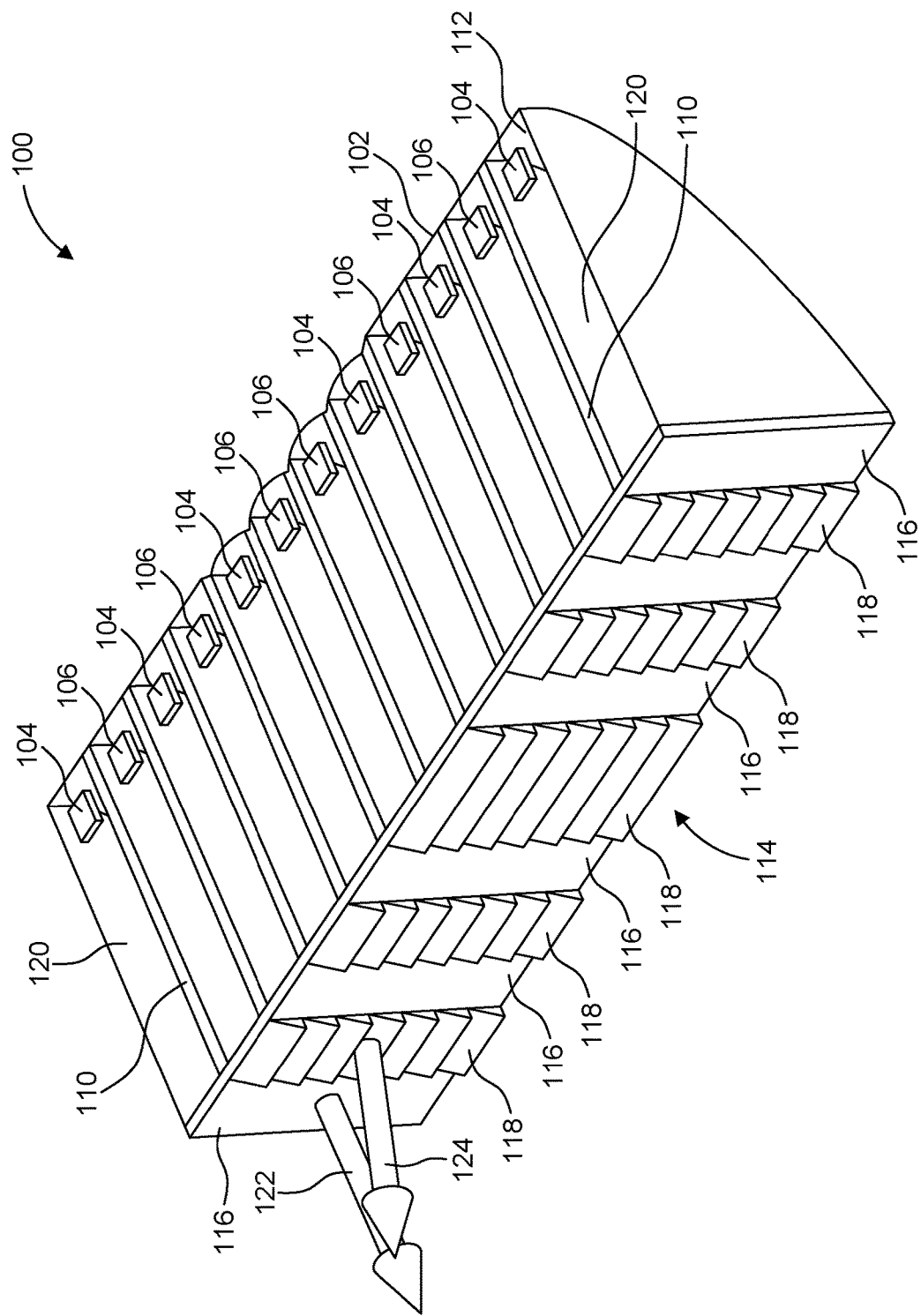
FIG. 2 is a perspective, schematic view of an example lighting unit in accordance with the present disclosure.

Referring now to FIG. 2, a lighting unit 100 is depicted in accordance with the present disclosure. The lighting unit 100 can provide one or more advantages over prior art lights, such as the prior art warning light 10 of FIG. 1.

In some examples, the lighting unit 100 is a light bar.

The lighting unit 100 includes a housing 102. The housing 102 houses a first set of light emitters 104 and a second set of light emitters 106.

In this example, the first and second light emitters substantially alternate along a longitudinal dimension of the housing 102. In other examples, the first and second sets of light emitters can be positioned however desired, e.g., a row of the first light emitters and a separate row of the second light emitters that is positioned above, below, or beside the row of first light emitters. The light emitters can also be positioned in a two dimensional array, such as a checkered array of alternating first and second light emitters along two perpendicular axes.

The lighting unit 100 optionally includes a plurality of reflector partitions 110 adapted to minimize interference between light beams from different light emitters. A reflective surface 112 of the lighting unit 100 concentrates light energy from the light emitters towards the propagation face 114 of the lighting unit 100. Optical components of the lighting unit 100, such as the reflector partitions 110 and the reflective surface 112 can be used to provide light beams having desired attributes (e.g., brightness, beam width, etc.).

The propagation face 114 includes a plurality of substantially transparent and non-deflecting lenses 116 that alternate in the longitudinal direction with substantially transparent and refracting lens or prisms 118.

When activated, each of the light emitters 104 is positioned in cooperation with the reflecting surface 112 and the reflector partitions 110 to emit light that propagates substantially towards the corresponding lens 116 via the corresponding propagation chamber 120.

When activated, each of the light emitters 106 is positioned in cooperation with the reflecting surface 112 and the reflector partitions 110 to emit light that propagates substantially towards the corresponding prism 118 via the corresponding propagation chamber 120.

In some examples, the propagation chambers 120 at least substantially form vacuums to enhance light propagation towards the corresponding lens 116 or prism 118.

The lenses 116 are configured such that incident light from the corresponding light emitters 104 propagates substantially in the direction of the arrow 122, i.e., substantially parallel to the primary propagation direction of the light within the corresponding propagation chamber 120.

The prisms 118 are configured such that incident light from the corresponding light emitters 106 propagates from the propagation face substantially in the direction of the arrow 124, i.e., at a predefined deflection angle θ (see FIG. 5) away from the primary propagation direction of the light within the corresponding propagation chamber 120.

In some examples, the prisms 118 are graduated, such that incident light from the corresponding light emitters 106 propagates from the propagation face 114 substantially in a direction or in multiple directions offset from the direction of the arrow 122 by an angle or angles that can vary depending on a specific orientation of the lighting unit 100 relative to a predefined reference plane or reference vector. For example, if the lighting unit 100 is tilted by 10° relative to the predefined reference plane or reference vector, at least a portion of each of the graduated prisms 118 provide for propagation of light from the propagation face 114 and generated by the light emitters 106 that is at an angle offset from the arrow 122 by a corresponding angle of 10°; if the lighting unit 100 is tilted by 20° relative to the predefined reference plane or reference vector, at least a portion of each of the graduated prisms 118 provide for propagation of light from the propagation face 114 and generated by the light emitters 106 that is at an angle offset from the arrow 122 by a corresponding angle of 20°, and so forth.

According to a further example lighting unit, the orientation of the light emitters 106 is shifted within the housing 102 relative to the propagation face as compared with the orientation of the light emitters 104 in order to achieve the same predefined deflection angle θ (FIG. 5) of the light that propagates from the propagation face and generated by light emitters 104 as compared with the light that propagates from the propagation face and generated by the light emitters 106. In these examples, the propagation face need not include prisms, for example, and instead can include a single non-deflective lens extending along the entire longitudinal length of the lighting unit.

According to a further example lighting unit, the orientations of the light emitters 104 and/or the light emitters 106 are not fixed relative to the housing 102, but rather adjust (e.g., on pivots) depending on a detected orientation of the lighting unit relative to a reference plane, such as the ground or a reference vector, such as a gravity force vector.

In some examples of the lighting unit 100, at least one controller controls when the light emitters 104 are activated and when the light emitters 106 are activated. In some examples, the light emitters 104 and the light emitters 106 are controlled so as not to be activated at the same time. Which light emitters are activated can depend on an orientation of the lighting unit 100 relative to a reference plane, such as the ground, or a reference plane that coincides with a gravity force vector, as described in greater detail below.

Figure 3:
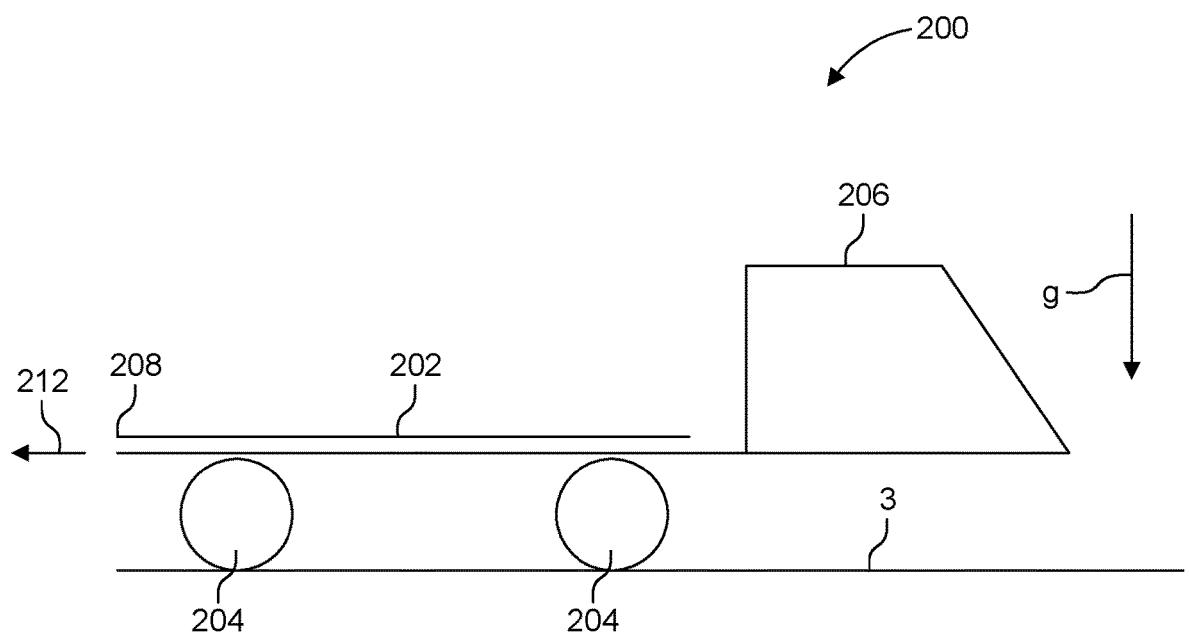
FIG. 3 is a side view of a schematic representation of a construction vehicle with an untilted tiltable bed.
Figure 4:
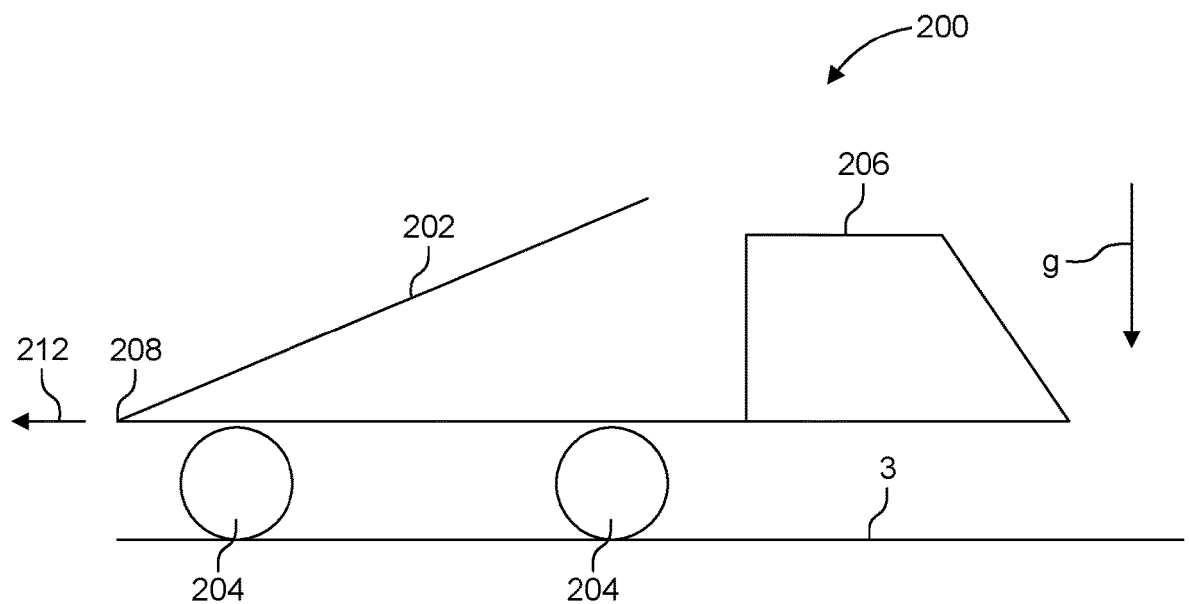
FIG. 4 is a side view of a schematic representation of the construction vehicle of FIG. 3, with a tilted bed.

Referring to FIGS. 3 and 4, an object 200 is schematically represented in profile. In this example, the object 200 is a construction vehicle (e.g., a dump truck) with a tiltable bed 202. The construction vehicle 200 includes wheels 204 that rest on the ground 3, and a cab 206. A gravity force vector g representing the force of gravity is perpendicular to the ground 3.

A lighting unit such as the lighting unit 100 can be mounted to the vehicle 200. In some examples, the lighting unit 100 can be mounted removably with one or more fasteners or other means, such as adhesive. In other examples, the lighting unit is integrally positioned within the structure of the vehicle 200.

Positioning of the lighting unit on the vehicle 200 can be selected for specific purposes. In some examples, one or more of the lighting units can be placed on the tiltable bed 202, e.g., at the location 208 at the rear of the tiltable bed 202, such that light from the light emitters of the one or more lighting units propagates in the direction of the arrow 212.

In particular, when the tiltable bed 202 is untilted, as shown in FIG. 3, the light emitters 104 (FIG. 2) are activated and generate light that propagates primarily in the direction of the arrow 212, i.e., parallel to the ground 3 and perpendicular to the gravity vector g. When the tiltable bed 202 is tilted, as shown in FIG. 4, the light emitters 106 (FIG. 2) are activated and generate light that propagates primarily in the direction of the arrow 212, i.e., parallel to the ground 3 and perpendicular to the gravity vector g.

Thus, whether the tiltable bed 202 is tilted or not, light propagates from the lighting unit parallel to the ground 3 such that light is visible from behind the vehicle 200 whether the bed 202 is tilted or not, thereby improving the safety of the vehicle 200.

In some examples, the light emitted by the light emitters 104 differs in one or more indicia from the light emitted by the light emitters 106 such that it can be visually determined whether the bed 202 is tilted or not tilted based on the indicia presented. Such indicia can include, for example, colors or wavelength bands, flash patterns, beam width, beam brightness, etc.

Figure 5:
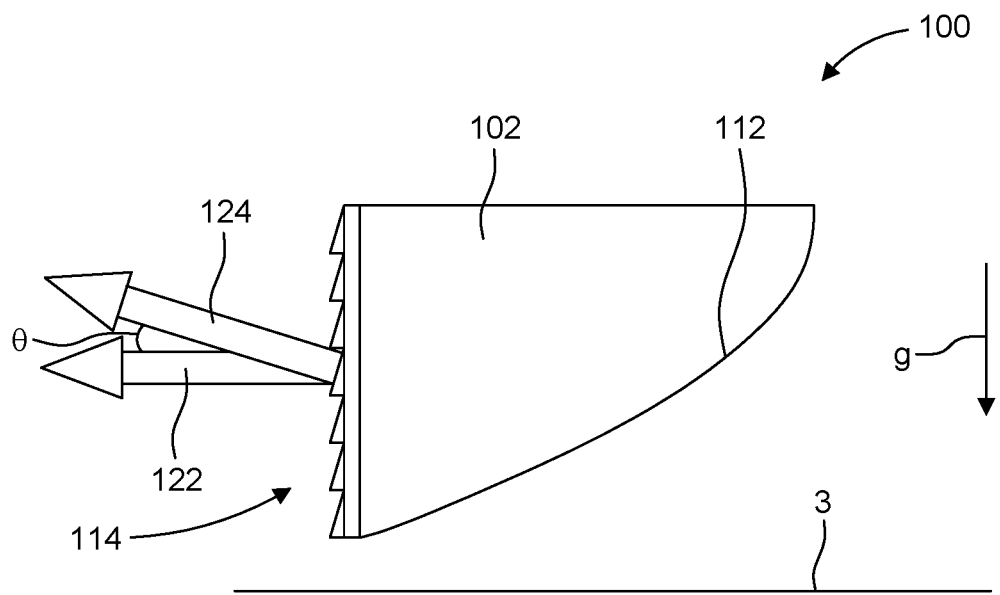
FIG. 5 is a side view of the lighting unit of FIG. 2 in an untilted configuration.

Referring to FIG. 5, the lighting unit 100 is depicted in an untilted orientation relative to the ground 3. Thus, the orientation of the lighting unit 100 in FIG. 5 can correspond to a lighting unit mounted at the location 208 on the bed 202 of the vehicle 200 in FIG. 3. In the orientation of the lighting unit 100 in FIG. 5, the light emitters 104 (FIG. 2) are activated and the light emitters 106 are inactive. Light generated by the active light emitters 104 propagates from the propagation face 114 via the lenses 116 (FIG. 2) along the direction of the arrow 122, parallel to the ground 3 and perpendicular to the gravity force vector g.

Figure 6:
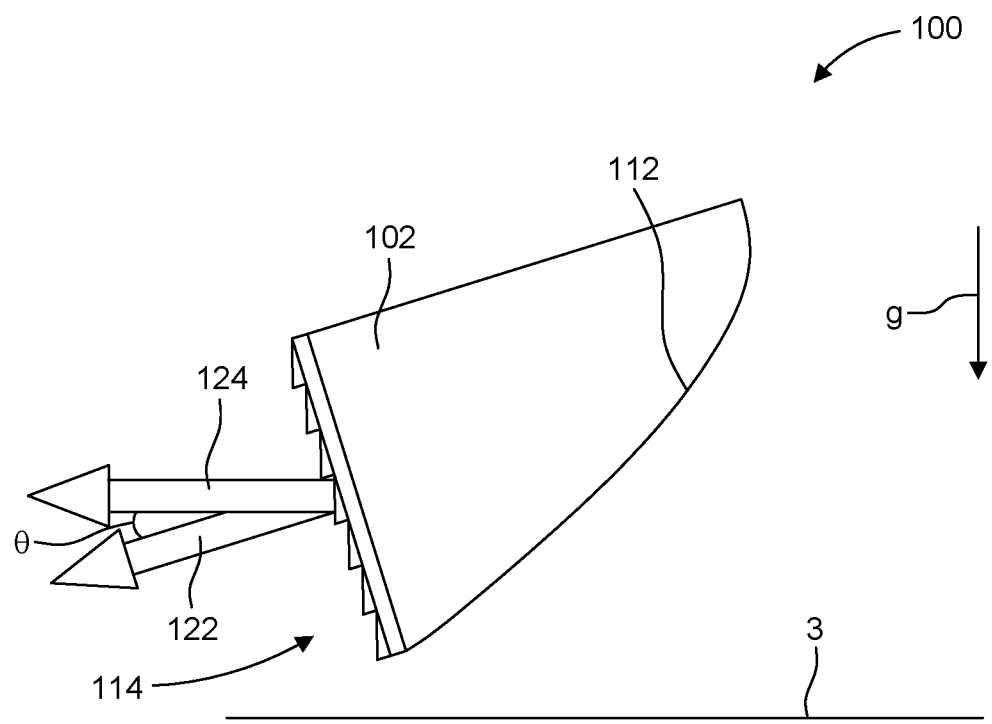
FIG. 6 is a side view of the lighting unit of FIG. 2 in a tilted configuration.

Referring to FIG. 6, the lighting unit 100 is depicted in a tilted orientation relative to the ground 3. Thus, the orientation of the lighting unit 100 in FIG. 6 can correspond to a lighting unit mounted at the location 208 on the bed 202 of the vehicle 200 in FIG. 4. In the orientation of the lighting unit 100 in FIG. 6, the light emitters 106 (FIG. 2) are activated and the light emitters 104 are inactive. Light generated by the active light emitters 106 propagates from the propagation face 114 via the prisms 118 (FIG. 2) along the direction of the arrow 124, parallel to the ground 3 and perpendicular to the gravity force vector g.

Control of the light emitters 104 and 106 in different orientations of the lighting unit 100 relative to a reference plane will now be described in greater detail.

Figure 7:
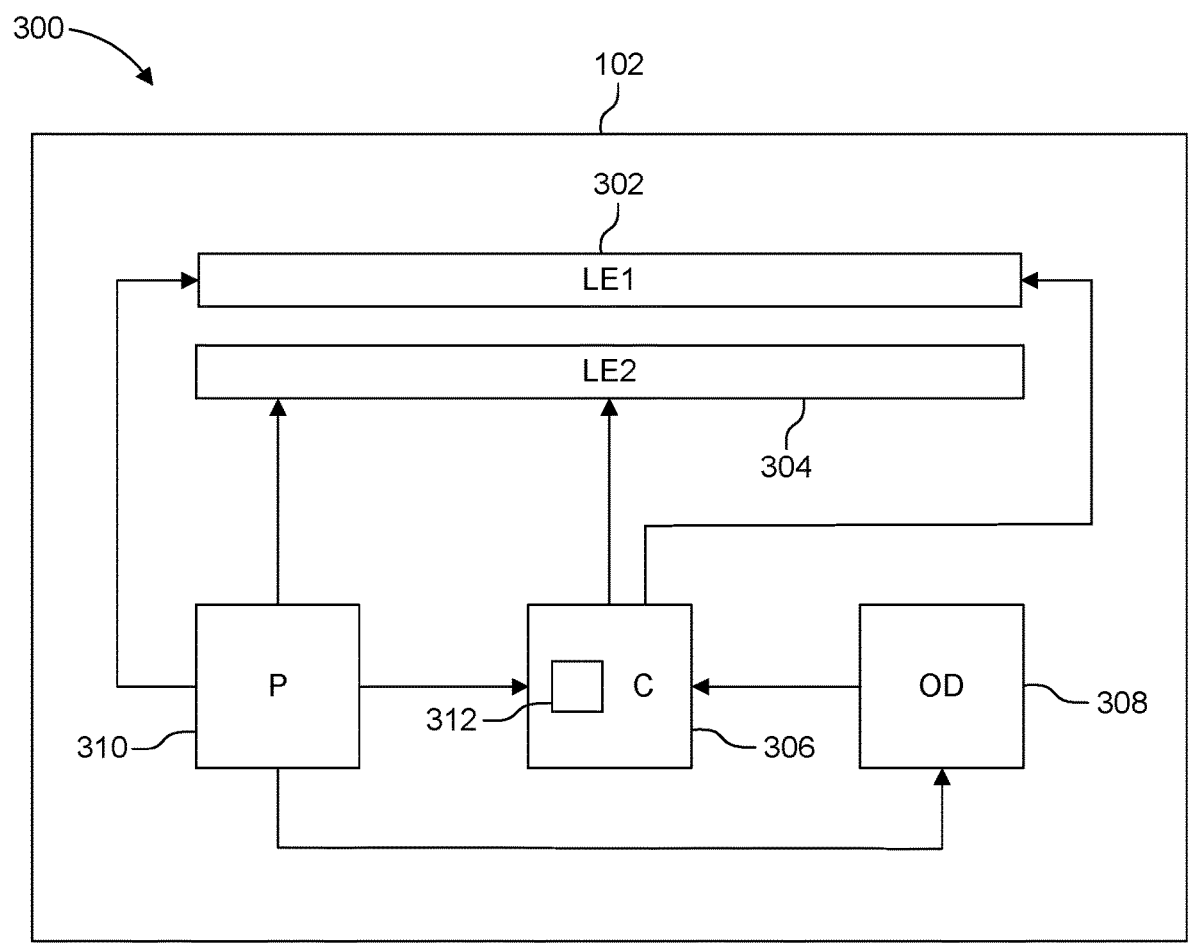
FIG. 7 is a schematic representation of a lighting system in accordance with the present disclosure.

Referring to FIG. 7, a schematic representation of a lighting system 300 in accordance with the present disclosure is depicted.

Optionally, the components of the system 300 that will be described below can be included in a lighting device. In some examples of such a lighting device, the system components are at least partially physically contained in the housing of a lighting unit, such as the housing 102 described above in connection with FIG. 2. However, it should be appreciated that one or more components of the system 300 can be disposed remotely from the lighting unit and lighting unit housing, e.g., in another part of an object to which the lighting device or lighting unit is mounted.

The system 300 includes at least one first light emitter 302, at least one second light emitter 304, at least one controller 306, at least one orientation detector 308, and at least one power source 310.

The controller 306 includes at least one processor 312 and/or other logic device, such as a field programmable gate array. In some examples, the processor or other logic device is adapted to execute instructions, such as computer-readable instructions stored on a non-transitory medium.

Logic circuitry electronically connects the controller 306 with the orientation detector 308, and the light emitters 302 and 304. The logic circuitry conveys logic signals from the orientation detector 308 to the controller 306, and from the controller 306 to the light emitters 302 and 304.

The controller 306 processes signals provided by the orientation detector 308 and provides control signals to the light emitters 302 and 304 for activating and deactivating the light emitters 302 and 304 based on the signals received from the orientation detector 308.

The power source 310 supplies electric power, via conductive elements, to the light emitters 302 and 304, the orientation detector 308, and the controller 306. In some examples, the power source 310 is a battery housed by the housing 102. In some examples, the power source 310 is physically external to the lighting unit, such as a battery of a vehicle to which the lighting unit is mounted.

In some examples, the at least one first light emitter 302 corresponds to the light emitters 104 described above in connection with FIG. 2. In some examples, the at least one second light emitter 304 corresponds to the light emitters 106 described above in connection with FIG. 2.

The orientation detector 308 detects a relative orientation of a lighting unit or a portion of an object to which the lighting unit is mounted. In some examples, the orientation is detected relative to a predefined reference plane, or relative to the direction of a gravity force vector. For example, using the reference plane or vector, the orientation detector 308 can detect a change in orientation of the lighting unit or object portion relative to a predefined baseline orientation of the lighting unit or object portion.

In some examples, the orientation detector 308 is an accelerometer that detects changes in inclination of the lighting unit or object portion relative to the force of gravity.

The orientation detector 308 feeds signals carrying information about the detected orientation to the controller 306, which processes the orientation signals and controls the light emitters 302 and 304 accordingly, e.g., by activating the at least one light emitter 304 and deactivating the at least one light emitter 302 in response to a changed inclination away from a baseline inclination.

In some examples, the controller 306 receives orientation signals from orientation detector 308 at least substantially continuously. In some examples, the controller 306 receives orientation signals from the orientation detector 308 periodically, or only when the orientation detector 308 has detected a change in orientation.

Figure 8:
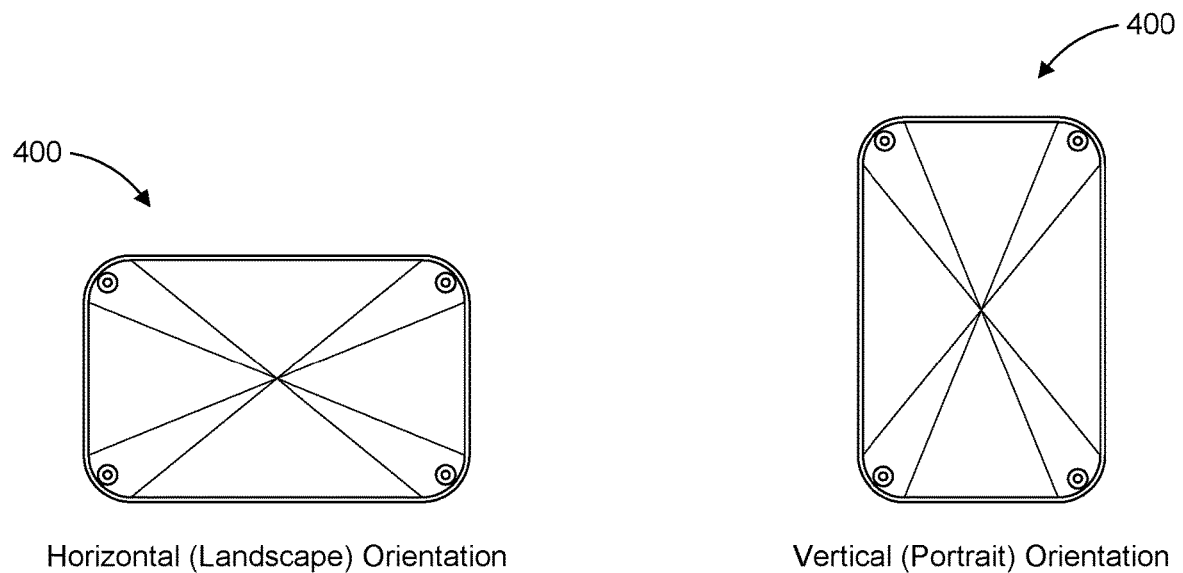
FIG. 8 depicts two example use applications of a lighting unit in accordance with the present disclosure.

FIG. 8 depicts two example use applications of a lighting unit 400 in accordance with the present disclosure.

The lighting unit 400 includes light emitters, an orientation detector, and a controller, as described above.

As shown in FIG. 8, the lighting unit 400 can be mounted in different orientations onto a given object, such as a vehicle. For example, the lighting unit 400 can be mounted in a first orientation onto the vehicle, as shown on the left side of FIG. 8, or alternatively in a second orientation, as shown on the right side of FIG. 8, the second orientation being rotated by a given amount (in this case, 90°) compared with the first orientation.

In these examples, the orientation detector can be configured to detect the mounting orientation of the lighting unit 400 and reset the baseline orientation of the lighting unit 400 based on the detected mounting orientation. The controller can then provide control signals to the light emitters based on a detected change in orientation (e.g., a change in inclination) of the lighting unit 400 from its reset baseline orientation relative to the predefined reference plane or vector.

In some examples, the light emitter or light emitters that are activated by the controller can depend on the detected mounting orientation of the lighting unit 400. For example, when the lighting unit 400 is in a first mounting orientation and a given inclination relative to a reference plane or vector, a first lighting element or set of lighting elements are activated and a second lighting element or set of lighting elements are inactive. When the lighting unit 400 is in a second mounting orientation at the same given inclination relative to the reference plane or vector, the second lighting element or set of lighting elements are activated and the first lighting element or set of lighting elements are inactive.

In some examples, one or more indicia (e.g., colors or wavelength bands, flash patterns, beam width, beam brightness, etc.) of the light propagated from the lighting unit 400 can vary depending on the mounting orientation of the lighting unit 400.

Figure 9:
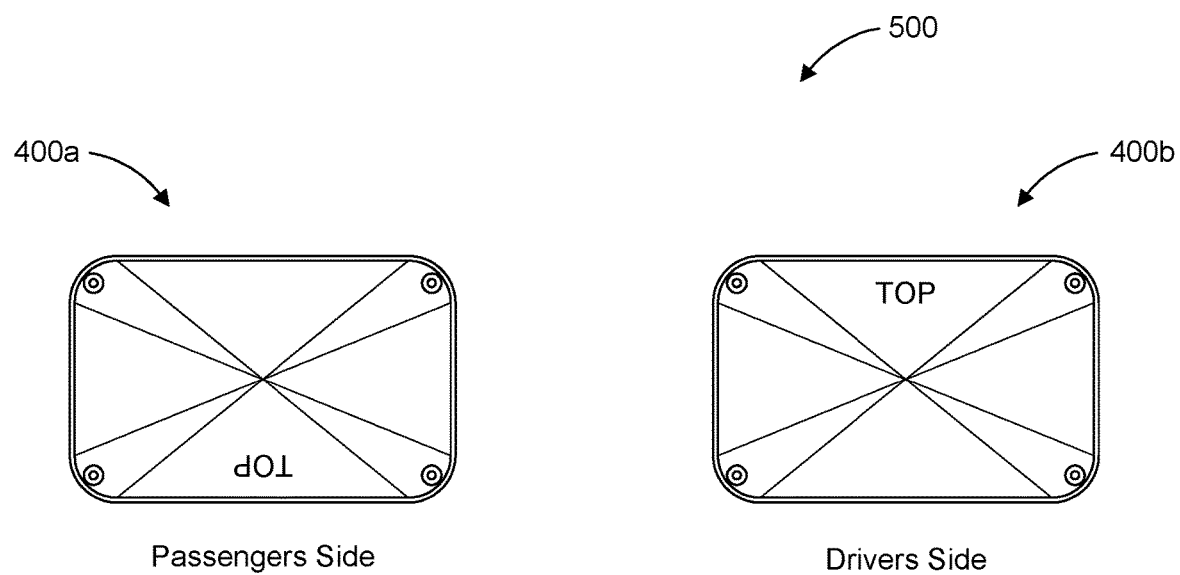
FIG. 9 depicts a further example use application of a pair of lighting units in accordance with the present disclosure.

FIG. 9 depicts a further example use application of a pair 500 of lighting units 400a and 400b in accordance with the present disclosure. The lighting units 400a and 400b can be mounted to the same object. For example, the lighting unit 400a is mounted at a left side (e.g., driver side) of a vehicle, and the lighting unit 400b can be mounted opposite to the lighting unit 400a on the right side (e.g., passenger side) of the vehicle. Such a vehicle could be an emergency vehicle, like a fire truck, ambulance, etc.

The lighting units 400a and 400b are identical. However, the mounting orientation of the lighting unit 400b on the object is rotated 180° relative to the mounting orientation of the lighting unit 400a.

Each of the lighting units 400a and 400b includes light emitters, an orientation detector, and a controller, as described above.

The respective orientation detectors can be configured to detect the mounting orientations of the lighting units 400a and 400b. The controllers can then provide control signals to the light emitters based on a detected change in orientation (e.g., a change in inclination) of the lighting unit 400 from its reset baseline orientation relative to a predefined reference plane or vector.

In some examples, the light emitter or light emitters that are activated by the controller can depend on the detected mounting orientation of the lighting unit 400a and 400b. For example, for the lighting unit 400a at a given inclination relative to a reference plane or vector, a first lighting element or set of lighting elements are activated and a second lighting element or set of lighting elements are inactive. For the lighting unit 400b at the same inclination relative to the reference plane or vector, the second lighting element or set of lighting elements are activated and the first lighting element or set of lighting elements are inactive.

In some examples, one or more indicia (e.g., colors or wavelength bands, flash patterns, beam width, beam brightness, etc.) of the light propagated from the lighting unit 400a differ from those that propagate from the lighting unit 400b due to the different mounting orientations of the lighting units. That is, the different mounting orientations are detected and fed to the respective controllers, which cause light emissions from the respective light emitters of the lighting units 400a and 400b that present different indicia from each other as a function of the mounting orientation.

For example, light propagating from the lighting unit 400a presents in a first flashing pattern and/or wavelength band, while light propagating from the lighting unit 400b presents a second flashing pattern and/or wavelength band that differs in one or more respects from the first flashing pattern and/or wavelength band. By standardizing the indicia, observers can easily determine, e.g., which side of the vehicle is which based on the indicia presented from the lighting units 400a and 400b.

As illustrated, the various embodiments described herein can include a system memory. The memory can provide non-volatile, non-transitory storage for the device. The memory can store instructions that are executed by the controller to perform one or more functions or acts, such as those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A lighting system, comprising:
   a first set of light emitters;
   a second set of light emitters;
   an orientation detector;
   a controller, the controller being adapted to control illumination of the first and second sets of light emitters such that the first set of light emitters are activated and the second set of light emitters are inactive when a first orientation relative to a predefined reference plane or reference vector is detected by the orientation detector, and such that the second set of light emitters are activated and the first set of light emitters are inactive when a second orientation relative to the predefined reference plane or reference vector is detected by the orientation detector, the second orientation being different from the first orientation; and
   a housing that houses the first and second sets of light emitters, wherein the controller is adapted to control illumination of the first and second sets of light emitters based on a detected orientation of the housing provided by the orientation detector,
   wherein the first and second sets of light emitters are arranged in the housing such that positions of the light emitters of the first set alternate with positions of the light emitters of the second set.

2. The lighting system of claim 1, wherein the orientation detector is an accelerometer.

3. The lighting system of claim 2, wherein the accelerometer is configured to detect an orientation relative to a gravity force vector.

4. The lighting system of claim 1, wherein the housing is mounted to a vehicle.

5. The lighting system of claim 4, wherein the housing is mounted to a tiltable bed or a tiltable cab of the vehicle.

6. The lighting system of claim 4, wherein the orientation detector is configured to detect a mounting orientation of the lighting unit relative to the vehicle.

7. The lighting system of claim 4, wherein the housing houses the orientation detector and the controller.

8. The lighting system of claim 1, wherein the housing includes a light propagation face, the light propagation face being defined by first and second sets of lenses having different refractive properties.

9. The lighting system of claim 8, wherein the first set of light emitters are positioned to emit light at a different angle relative to the light propagation face than the second set of light emitters.

10. The lighting system of claim 1, wherein the first set of light emitters are configured to emit light having first wavelengths, wherein the second set of light emitters are configured to emit light having second wavelengths, and wherein the first and second wavelengths are different.

11. The lighting system of claim 1, wherein the first and second sets of light emitters are positioned in a light bar.

12. A lighting system, comprising:
    a first set of light emitters;
    a second set of light emitters;
    an orientation detector;
    a controller, the controller being adapted to control illumination of the first and second sets of light emitters such that the first set of light emitters are activated and the second set of light emitters are inactive when a first orientation relative to a predefined reference plane or reference vector is detected by the orientation detector, and such that the second set of light emitters are activated and the first set of light emitters are inactive when a second orientation relative to the predefined reference plane or reference vector is detected by the orientation detector, the second orientation being different from the first orientation;
    a housing that houses the first and second sets of light emitters, wherein the controller is adapted to control illumination of the first and second sets of light emitters based on a detected orientation of the housing provided by the orientation detector,
    wherein the housing includes a light propagation face, the light propagation face being defined by first and second sets of lenses having different refractive properties; and
    wherein the positions of the lenses of the first set of lenses alternate with positions of the lenses of the second set of lenses.

* * * * *